Patented July 24, 1934

UNITED STATES PATENT OFFICE 1,967,244

PRODUCTION OF ORGANIC FLUORINE COMPOUNDS

Lee Cone Holt, Edgemoor, and Edwin Lorenzo Mattison, Wilmington, Del., assignors to Kinetic Chemicals Inc., Wilmington, Del., a corporation of Delaware No Drawing. Application August 31, 1932, Serial No. 631,122

12 Claims. (Cl. 260—160)

This invention relates to carbon compounds, more particularly organic fluorine compounds, and a process for the production thereof.

It is an object of the invention to produce compounds containing one or more acyclic carbon atoms having attached thereto an aryl group and one or more fluorine atoms. Another object is the production of aryl compounds having side chains containing acyclic carbon atoms in which are substituted fluorine as well as other halogen atoms. A further object is to produce ring halogenated aryl derivatives containing aliphatic side chains in which one or more fluorine atoms are present. A still further object is the provision of a new and improved process for producing compounds of the character above described. Other objects will appear hereinafter.

These objects are accomplished according to the broader aspects of the invention whereby organic fluorine compounds are produced by reacting a fluorinating agent with a compound containing one or more acyclic carbon atoms having attached thereto an aryl group and one or more halogen atoms other than fluorine at elevated temperatures.

While the invention is susceptible of considerable variation and modification in the manner of its practical application, particularly as regards the nature and proportions of the reactants and the exact method of procedure, the following examples in which the parts are by weight, will serve to illustrate how the invention may be practiced.

Example I

Two hundred parts of gaseous hydrogen fluoride were passed into 400 parts of freshly distilled benzo-trichloride maintained at a temperature of about 110° C. The evolved vapors were passed into water. The oily product which formed was separated and mixed with the main reaction mass. The resultant mixture was then subjected to steam distillation, the distillate containing largely benzo-fluoro-dichloride (B. P. 178–180° C.) with small amounts of benzo-difluoro-chloride.

Example II

A product consisting substantially of benzo-trichloride was prepared by chlorinating toluene with phosphorus pentachloride at a temperature of about 190–200° C. until substantially all of the benzal chloride was eliminated. This product (specific gravity 1.39–1.40) was then freshly distilled to produce substantially pure benzo-trichloride. About 391 parts of this freshly distilled benzo-trichloride were then placed in a deep and relatively narrow copper reaction tube and a stream of substantially anhydrous hydrogen fluoride was passed into the mixture, with agitation, from the bottom of the tube at a rate of about 60 parts per hour. The temperature of the reaction mixture was maintained at about 170° C.

The vapors evolved from the surface of the reaction mixture which contained hydrogen chloride, fluorinated organic compounds and some unconverted benzo-trichloride were passed into a reflux condenser maintained at a temperature of about 150° C., the condensate from this condenser being returned to the reaction mixture. The vapors passing through this condenser were led into a receiver containing water whereby a heavy water insoluble oil formed. After a period of about two and one-half hours, the reaction was discontinued. The products in the reaction vessel were then steam distilled to yield largely benzo-fluoro-dichloride with small amounts of benzo-difluoro chloride, benzo-trifluoride, and benzo trichloride. The products in the receiver were steam distilled to produce largely benzo-difluoro-chloride with small amounts of benzo-fluoro-dichloride, benzo-trifluoride and benzo-trichloride. The various components of the mixtures were then separated by fractional distillation. Benzo-fluoro-dichloride boils at a temperature of about 178–180° C., benzo-difluoro-chloride at a temperature of about 142–3° C., benzo-trifluoride at a temperature of about 102–5° C. and benzo-trichloride at a temperature of about 213° C.

The invention is generally applicable to the production of organic fluorine compounds from compounds containing one or more acyclic carbon atoms having attached thereto an aryl group and one or more halogen atoms other than fluorine. As examples of compounds which may be fluorinated in accordance with the invention may be mentioned benzo-trichloride, benzo-trichloride derivatives having substituent groups or atoms, such as alkyl, chlorine or bromine in the aryl portion thereof, and halogenated xylenes such as chloro-1:3-di-(trichloro-methyl) benzenes (prepared by suitable chlorination of meta-xylene). It will be understood that operating conditions may vary widely depending largely upon the nature of the compounds subjected to fluorination and the results desired. Although halogens other than fluorine (including chlorine, bromine and iodine) attached to acyclic carbon atoms of aryl derivatives may be replaced by fluorine in accordance with this invention, the process has thus far been particularly advantageous in the fluorination of alphyl derivatives containing chlorine in the side chain.

The term hydrogen fluoride, unless otherwise indicated, is intended to include and cover not only the pure product but also hydrogen fluoride or hydrofluoric acid which may contain small amounts of impurities, as for example water.

The fluorination reaction may be carried out with the organic halogen derivative in liquid or vapor phase. If it is desired to effect the reaction in liquid phase and the reaction mixture boils below the desired temperature of reaction, superatmospheric pressures may be employed to maintain the reaction mass in liquid condition. If desired, the fluorination may be effected in the presence of a relatively inert solvent or suspension media such as, for example, a fluorinated compound which is liquid at the temperature employed. Hydrogen fluoride may be introduced as a liquid but is preferably passed into the reaction zone as a vapor. If it is desired to operate the process with the reactants in vapor phase and the products boil at temperatures greater than the desired reaction temperature, the process may be conveniently carried out under subatmospheric pressures.

The proportion of reactants may vary within relatively wide limits depending largely upon the nature thereof, the conditions of operation and the results desired. Stoichiometrically, one equivalent of hydrogen fluoride carresponds to one equivalent of replaceable halogen in the compound to be fluorinated. In general, it is preferable to use an excess of hydrogen fluoride.

The process may be operated continuously or intermittently. The reaction and the separation or isolation of the products may be carried out simultaneously or in separate steps.

The temperature at which the reaction is effected may be varied over a relatively wide range, depending largely upon the nature of the compound to be fluorinated and the results desired. It is desirable, however, to carry out the reaction at a temperature above about 80° C. Where the starting materials are solids at this temperature, it may be desirable to operate at temperatures sufficiently high to render the starting materials liquid. The temperature employed should preferably be below that at which decomposition of the reactants and/or products occurs.

For the fluorination of benzo-trichloride temperatures within the range of about 110° C. to 200° C. are preferably employed. For the fluorination of halogenated xylenes such as chloro-1:3-di-(tri-chloro-methyl) benzenes, it is desirable to effect the reaction at temperatures above about 90° C.

Since the products of the invention are relatively high boiling they may be used as solvents or reaction media. Fluorinated derivatives obtained from benzo-trichloride and ring substituted benzo-trichloride are valuable for use as dye intermediates.

The invention provides a new method of producing compounds of the character described which is practical and economical. A particular advantage is that it is operated without the use of catalyst, as hitherto considered necessary for commercial operation.

As many apparent and widely different embodiments of this invention may be made without departing from the spirit thereof, it is to be understood that we do not limit ourselves to the foregoing examples or description except as indicated in the following claims.

We claim:

1. The process of producing organic fluorine compounds which comprises reacting together without a catalyst hydrogen fluoride and a compound containing at least one acyclic carbon atom having attached thereto an aryl group and at least one halogen atom other than fluorine, at a temperature about 80° C.

2. The process of producing organic fluorine compounds which comprises reacting together without a catalyst hydrogen fluoride and a compound containing at least one acyclic carbon atom having attached thereto an aryl group and at least one halogen atom other than fluorine, at a temperature above about 80° C. and below the decomposition temperature.

3. The process of producing organic fluorine compounds which comprises reacting together without a catalyst anhydrous hydrogen fluoride and a compound containing at least one acyclic carbon atom having attached thereto an aryl group and at least one halogen atom other than fluorine at a temperature above about 80° C. and below the decomposition temperature.

4. The process of producing fluorinated toluene derivatives which comprises reacting together without a catalyst hydrogen fluoride and a halogenated toluene containing halogen atoms other than fluorine in the side chain at a temperature above about 80° C. and below the decomposition temperature.

5. The process of producing benzo-fluoro-chlorides which comprises reacting together without a catalyst benzo-trichloride and anhydrous hydrogen fluoride at a temperature above about 80° C. and below the decomposition temperature.

6. The process of producing alphyl compounds containing fluorine which comprises reacting together without a catalyst hydrogen fluoride and a compound containing at least one acyclic carbon atom having attached thereto an aryl radical and three halogen atoms, at least one of which is a halogen other than fluorine, at a temperature above about 80° C. and below the decomposition temperature.

7. The process of producing alphyl compounds containing fluorine which comprises reacting together without a catalyst hydrogen fluoride and a compound containing at least one acyclic carbon atom having attached thereto an aromatic radical of the benzene series and three halogen atoms, at least one of which is a halogen other than fluorine, at a temperature above about 80° C. and below the decomposition temperature.

8. The process of producing alphyl compounds containing fluorine which comprises reacting together without a catalyst hydrogen fluoride and a compound containing at least one acyclic carbon atom having attached thereto an aromatic radical of the benzene series and three chlorine atoms, at a temperature above about 80° C. and below the decomposition temperature.

9. The process of producing alphyl compounds containing fluorine which comprises reacting together without a catalyst hydrogen fluoride and a compound containing an acyclic carbon atom having attached thereto three halogen atoms, at least one of which is a halogen other than fluorine, and a phenyl radical which may contain substituents selected from group consisting of alkyl, halogen-alkyl, and halogens, and maintaining the temperature of the reaction above about 80° C. and below the decomposition temperature.

10. The process of producing alphyl compounds containing fluorine which comprises reacting together without a catalyst hydrogen fluoride and a halogenated xylene containing at least one halogen other than fluorine in at least one side chain, at a temperature above about 80° C. and below the decomposition temperature.

11. The process of producing alphyl fluorides which comprises reacting together without a catalyst chloro-1:3-di-(tri-chloro-methyl) benzenes and hydrogen fluoride at a temperature above about 90° C. and below the temperature giving rise to the formation of decomposition products.

12. The process which comprises reacting together without a catalyst benzo-trichloride and anhydrous hydrogen fluoride at a temperature within the range of about 110°–200° C.

LEE CONE HOLT.
EDWIN LORENZO MATTISON.

CERTIFICATE OF CORRECTION.

Patent No. 1,967,244.　　　　　　　　　　　　　July 24, 1934.

LEE CONE HOLT, ET AL.

It is hereby certified that error appears in the printed specification of the above numbered patent requiring correction as follows: Page 2, line 86, claim 1, before "about" insert the word above; and that the said Letters Patent should be read with this correction therein that the same may conform to the record of the case in the Patent Office.

Signed and sealed this 16th day of October, A. D. 1934.

(Seal)　　　　　　　　　　　　　　　　　Leslie Frazer
　　　　　　　　　　　　　　　　　Acting Commissioner of Patents.

80° C. and below the decomposition temperature.

10. The process of producing alphyl compounds containing fluorine which comprises reacting together without a catalyst hydrogen fluoride and a halogenated xylene containing at least one halogen other than fluorine in at least one side chain, at a temperature above about 80° C. and below the decomposition temperature.

11. The process of producing alphyl fluorides which comprises reacting together without a catalyst chloro-1:3-di-(tri-chloro-methyl) benzenes and hydrogen fluoride at a temperature above about 90° C. and below the temperature giving rise to the formation of decomposition products.

12. The process which comprises reacting together without a catalyst benzo-trichloride and anhydrous hydrogen fluoride at a temperature within the range of about 110°–200° C.

LEE CONE HOLT.
EDWIN LORENZO MATTISON.

CERTIFICATE OF CORRECTION.

Patent No. 1,967,244.

July 24, 1934.

LEE CONE HOLT, ET AL.

It is hereby certified that error appears in the printed specification of the above numbered patent requiring correction as follows: Page 2, line 86, claim 1, before "about" insert the word above; and that the said Letters Patent should be read with this correction therein that the same may conform to the record of the case in the Patent Office.

Signed and sealed this 16th day of October, A. D. 1934.

(Seal)

Leslie Frazer
Acting Commissioner of Patents.